April 21, 1953        P. M. GREEN        2,635,349
WELL-SURVEYING INCLINOMETER
Filed Dec. 2, 1950        3 Sheets-Sheet 1
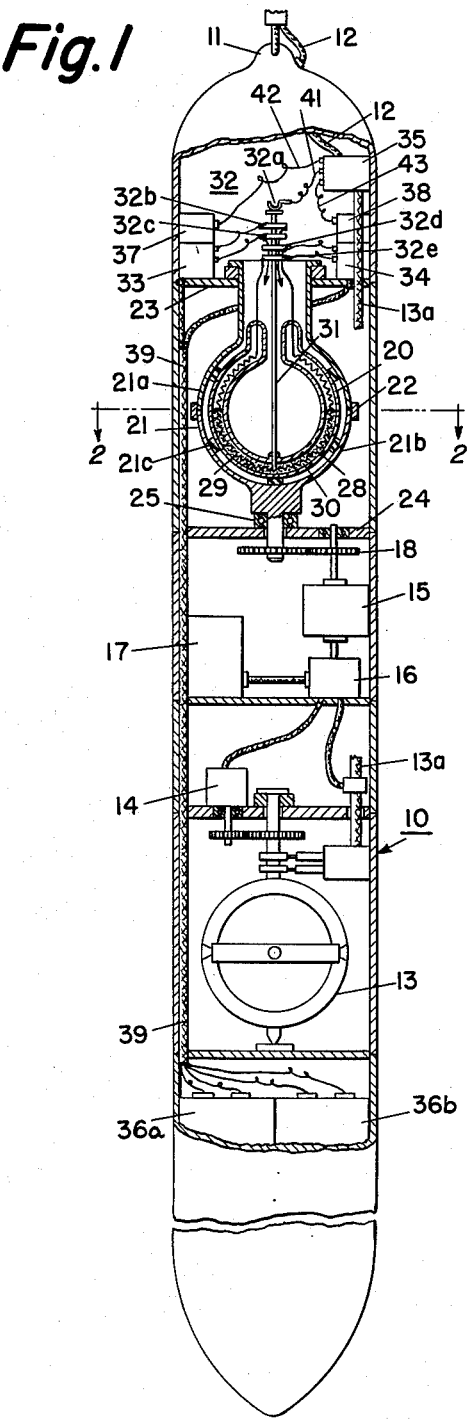
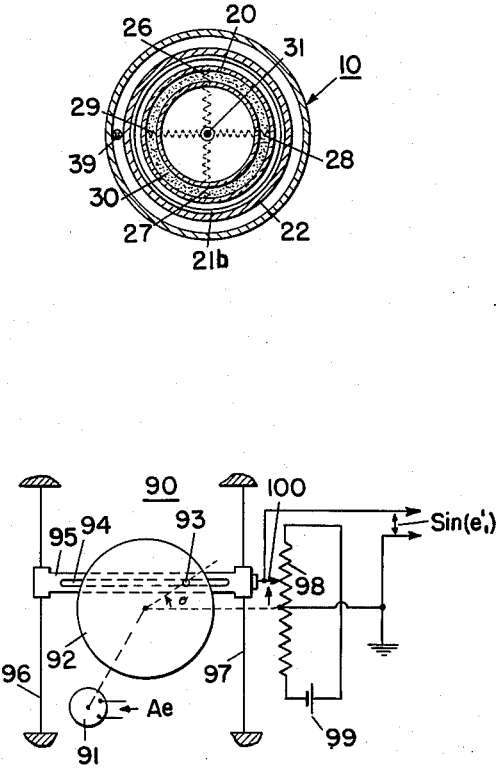
INVENTOR.
PHILLIP M. GREEN
BY
*Sidney A. Johnson*
ATTORNEY April 21, 1953  P. M. GREEN  2,635,349
WELL-SURVEYING INCLINOMETER
Filed Dec. 2, 1950  3 Sheets-Sheet 2
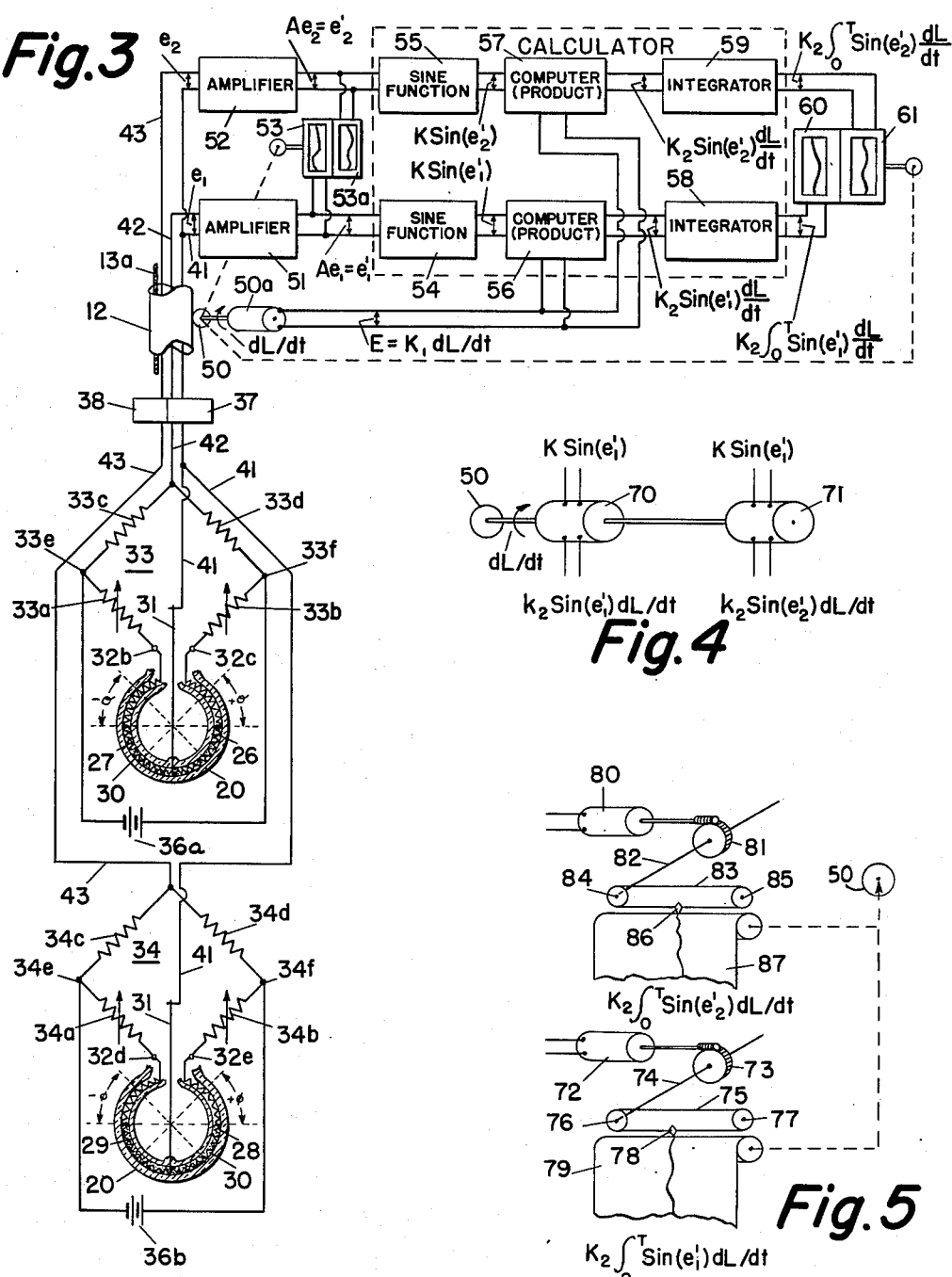
*INVENTOR.*
PHILLIP M. GREEN
BY
*Sidney A. Johnson*
ATTORNEY

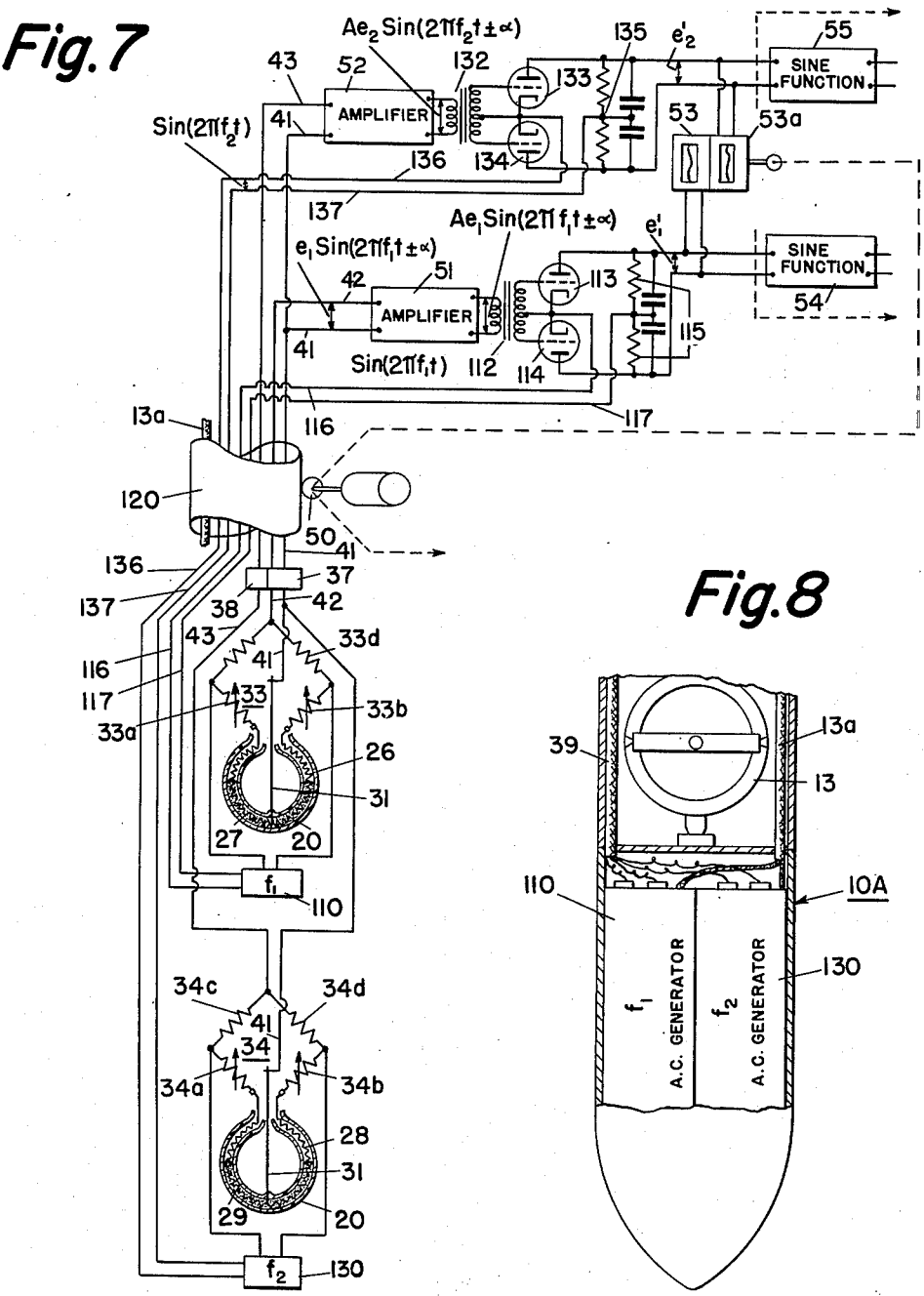

Patented Apr. 21, 1953

2,635,349

UNITED STATES PATENT OFFICE 2,635,349

WELL-SURVEYING INCLINOMETER

Phillip M. Green, Dallas, Tex., assignor, by mesne assignments, to Socony-Vacuum Oil Company, Incorporated, New York, N. Y., a corporation of New York Application December 2, 1950, Serial No. 198,803

7 Claims. (Cl. 33—205.5)

1

This invention relates to well-surveying instruments for determining the angle of inclination and horizontal displacement of a well, and more particularly relates to an inclinometer with which inclination and horizontal displacement are continuously and simultaneously determined as functions of the depth in a well to which an exploration unit of the inclinometer is lowered.

In the drilling of wells, many kinds of apparatus have been constructed for determining deviation of the well or bore hole from the vertical. Some measurements have been restricted to the determination of the maximum angle of inclination by such means as the record produced by a pool of ink on a cupped paper chart and by the etching of glass by acid. More commonly used means include photographic or electrical processes to provide readings on a multi-shot or progressive basis, or utilize a pendulum and associated contacts to provide an intermittent signal from which inclination in a vertical plane can be determined.

In accordance with this invention, the angle of the well from the vertical, often referred to as inclination or angle of drift, is continuously and positively determined by resolving it into components along angularly related vertical planes by varying impedance elements of balanceable circuit means in response to the sense and magnitude of these components of the inclination to produce unbalance signals proportional thereto, by conducting these unbalance signals to the surface, and by measuring the unbalance signals in positive and continuous determination of the components of inclination with respect to the angularly related vertical planes for their exhibition as functions of well depth.

Further in accordance with the invention, the unbalance signals are combined with a signal varying as a function of the velocity of the exploration unit in the well for measurement or recording of the drift or horizontal displacement as a function of well depth.

More specifically in accordance with this invention, a well-exploration system is provided with balanceable circuit means including impedance elements varying in response to inclination of the unit from the vertical to produce unbalance signals respectively representative of the components of the angle of inclination of said circuit means from the vertical in angularly related vertical planes. Separate measuring means are provided respectively responsive to the unbalance signals to indicate the sense and magnitude of the respective components of the angle

2 of inclination from the vertical. For determination of the horizontal displacement in the above vertical planes, a generator is coupled to the lowering cable for the exploration unit to produce a voltage proportional to the velocity of lowering. The unbalance signals and the generator voltage are applied to a calculator to provide an output corresponding with the horizontal displacement at the depth to which the circuit means are lowered.

For a more detailed disclosure of the invention and for illustration of various forms thereof, reference is made to the accompanying drawings in which:

Fig. 1 is a cut-away, elevational view of a well-exploration unit;

Fig. 2 is a sectional plan view of the exploration unit along line 2—2 of Fig. 1;

Fig. 3 is a schematic diagram of a well-surveying system;

Fig. 4 shows one form of computer/generator for use in the system of Fig. 3;

Fig. 5 shows one form of integrator for exhibiting horizontal displacement;

Fig. 6 is a schematic illustration of a device providing an electrical output equal to the sine function of its input, used in the computers of the measuring means;

Fig. 7 is a schematic diagram of an alternating-current bridge embodiment of the well-surveying system; and Fig. 8 is a cut-away, elevational view of the lower portion of the alternating-current embodiment of the exploration unit.

Referring to Fig. 1, exploration unit 10 is a long cylindrical casing adapted for lowering into and following the inclination of a well while suspended from eye-member 11. Cable 12 conducts power from the surface to components of the unit 10 including gyroscope 13 and associated servo-mechanism including servomotor 15 and also conducts unbalance signals from the exploration unit 10 to the surface. A spherical container 20 mounted within exploration unit 10 is rotatable about the axis of the exploration unit under control of gyroscope 13.

Gyroscope 13 provides an azimuth reference point for proper orientation of container 20 with reference to a fixed compass point selected while the exploration unit 10 is at the surface of the ground. If during its descent, the exploration unit 10 rotates in azimuth about its axis, the gyroscope 13 will remain fixed in azimuth and the relative motion therebetween develops a signal in pickup unit 14 which corresponds in magnitude and sense with the rotation of exploration unit 10 from its original axial position at the beginning of measurements. This signal is applied through control transformer 16 and amplifier and anti-hunt circuits 17 to servomotor 15. Servomotor 15 in response to the azimuth-error signal drives spherical container 20 through gear train 18 to effect rotation of container 20 which is equal and opposite to the rotation of exploration unit 10. In this manner, the spherical container 20 is maintained in its proper orientation with a fixed azimuth reference point located at the surface of the ground.

Spherical container 20 is constructed somewhat like a Dewar flask and may be of any suitable insulating material, such as glass or plastic, and is mounted in metallic hemispheres 21a and 21b for rigid mechanical support and for electrical shielding. The hemispheres 21a and 21b are held together by threaded ring 22 and the assembly mounted for rotation within exploration unit 10 by bearings in frames 23 and 24 thereof. Hemisphere 21b rests on thrust bearing 25 and projects through frame 24 for mechanical coupling to gear train 18 and servomotor 15.

As shown in Fig. 2, resistors 26 and 27 are mounted on an inside surface of spherical container 20 along a great circle which passes through the vertical axis: resistors 28 and 29 are also mounted on the same inside surface of spherical container 20 along a second great circle, passing through the vertical axis of container 20 and in spaced angular relation, preferably at right angles, to the great circle of resistors 26 and 27. When exploration unit 10 is in the vertical position, the great circles along which resistors 26—27 and resistors 28—29 are respectively positioned define angularly spaced vertical planes. With gyroscope 13 energized and through its associated servomechanism maintaining container 20 in a fixed azimuth, resistor pairs 26—27 and 28—29, together with their associated great circles and vertical planes, will maintain a fixed azimuthal position and will be in the reference planes along which components of the inclination of exploration unit 10 are measured for determination of the inclination of a well.

As shown in Fig. 1, container 20 is partly filled with liquid conductor 30, such as mercury, which contacts resistors 26 to 29 and shorts out that portion of each resistor which is immersed below the liquid level of conductor 30. As inclination of exploration unit 10 changes the position of spherical container 20 relative to the level of liquid conductor 30, varying portions of resistors 26 to 29 will be immersed and shorted out by liquid conductor 30. Accordingly, the effective values of resistors 26 to 29 will vary in response to inclination of exploration unit 10 and will be representative in sense and magnitude to the particular inclination thereof. For example, if the inclination of exploration unit 10 from the vertical tends to move the top of exploration unit 10 along a line between resistors 26 and 28, the liquid conductor will rise along resistors 26 and 28 and drop to a lower level on resistors 27 and 29.

Rod 31 is a conductor mounted in the bottom of container 20 for providing a common connection through liquid conductor 30 to the lower portions of the resistors 26—29. Connection from the upper end of rod 31 to relatively stationary circuit elements may be effected by any suitable sliding contact arrangement, such as contact 32a which maintains the circuit connections to rod 31 while container 20 is rotated. Brush and slip-ring assemblies 32d—32e provide rotating contact to resistors 28 and 29. Brush and slip-ring assemblies 32b—32c provide rotating contact to resistors 26 and 27 (not shown in Fig. 1). Resistors 26 and 27 are connected through slip rings 32d—32e to a balanceable bridge 33 and resistors 28—29 are connected through slip rings 32b—32c to a second balanceable bridge 34.

The two balanceable bridges 33, 34 are each adjusted for zero output when exploration unit 10 is in vertical position before lowering of the exploration unit, hence, any subsequent variation in the values of these resistance pairs will unbalance the respective bridge networks to develop an unbalance signal whose sense and magnitude is representative of the direction and magnitude of the inclination of exploration unit 10 with respect to the vertical plane of the corresponding great circle. Bridge network 33, including its associated resistor pair 26, 27, is energized from battery 36a or equivalent; bridge network 34, including its associated resistor pair 28, 29, is energized from battery 36b or equivalent.

In most situations, the unbalance signals from bridge networks 33 and 34 can be fed to terminal box 35 of unit 10 and thence through cable 12 to amplifying and measuring circuits on the surface with ample signal-to-noise ratio. However, if the unbalance signals are too weak for satisfactory use at the surface, or if an excessively high noise pickup along cable 12 is experienced, preamplifiers 37 and 38 are utilized in unit 10 to build the signals from bridge networks 33 and 34 to a level which assures that the signals at the measuring system will override the noise.

For a more detailed description of the manner in which inclination of exploration unit 10 produces unbalance signals characteristic of such inclination, reference is made to Fig. 3 which is an overall schematic diagram showing the balanceable networks of exploration unit 10 and the associated surface equipment. In Fig. 3, the pair of resistors 26 and 27 are shown in substantially vertical position of exploration unit 10 for which position liquid conductor 30 short circuits about half of each of resistors 26 and 27. Resistors 33a and 33b are adjustable so that balanceable network 33 may be preadjusted to zero output when container 20 is in vertical position preparatory to lowering of unit 10 in a well. The voltage of battery 36a is applied to input terminals 33e, 33f of balanceable network 33 and any unbalance signals appear between conductors 41 and 42 respectively connected to the conductor rod 31 and to the junction point of resistors 33c and 33d.

If spherical container 20 is rotated in a clockwise direction from the position illustrated in Fig. 3, the level of liquid conductor 30 will rise on resistor 26 and concurrently drop on resistor 27 to an angle (illustrated as $+\theta$) proportional to the angle of inclination of spherical container 20 away from vertical. Such change in liquid level relative to spherical container 20 decreases the effective value of resistor 26 and increases the effective value of resistor 27 in bridge network 33 so producing an unbalance signal between conductors 41 and 42 representative in sense and magnitude of the inclination of unit 10 from vertical in the plane of the great circle through resistors 26, 27. This unbalance signal ($e_1$) may be amplified in direct-current amplifier 51 to a higher value ($Ae_1 = e'_1$) and exhibited in an indicator or recorder 53 as that component of inclination of unit 10 which lies in the vertical plane defined by the great circle of resistor pair 26—27.

Wheel 50 rides on cable 12 or is otherwise coupled to some part of the hoisting mechanism for unit 10 so as to be driven at a speed proportional to the rate of lowering or raising of exploration unit 10. The chart for recorder 53 is driven by wheel 50 so as to plot the unbalance signal ($e_1$ or $e'_1$) as a function of the depth of the exploration unit in the well.

While a continuous record of the angle of inclination of a well as a function of depth is highly useful in well-surveying, a greater amount of information is obtained if the total horizontal displacement or horizontal drift can be simultaneously exhibited as a function of depth in the well. For such purpose, the amplified unbalance signal $Ae_1$ may be applied to a computer 54 of type providing an output which is the sine function ($k \sin (e'_1)$) of its input. Since horizontal displacement of unit 10 from the top of the well depends not only upon the angle of inclination of the bore but also upon the length of the bore which lies along a given angle of inclination, a voltage proportional to the rate at which the exploration unit is lowered in the well is required for multiplication with the above sine function of the angle of inclination. For this purpose, wheel 50 drives generator 50a at a speed which is proportional to the rate of lowering of exploration unit 10 to develop a voltage output E which is also proportional to this rate of lowering $dL/dt$ that is $E = k_1 dL/dt$. This rate voltage is fed to a computer 56 which also receives the sine function voltage from computer 54 so to provide an output voltage $E_1$ which is the product $$(k_2 \sin (e'_1) dL/dt)$$

of the two input voltages. This last expression represents the differential horizontal displacement for each small increment of depth along the well and must be integrated as in integrator 58, before the total horizontal displacement at a given depth can be determined and exhibited. The output of integrator 58

$$(k_2 \int_0^t \sin (e'_1) dL/dt)$$

is representative of the total horizontal displacement of the well from the starting point, and this output is applied to indicator-recorder 60. The chart of indicator-recorder 60 may be driven mechanically from wheel 50 in a manner similar to indicator 53 and thus will provide a record of total horizontal displacement as a function of depth in the well. It is to be noted that the unbalance signal $e'_1$ plotted as angle of inclination on indicator-recorder 53, and the voltage output from integrator 58 applied to indicator-recorder 60 as representative of total horizontal displacement, refer only to inclination and displacement of unit 10 with respect to the vertical plane defined by resistor pair 26—27 when exploration unit 10 is in the vertical plane.

Inclination of container 20 is the counterclockwise direction from the position illustrated in Fig. 3 will cause the level of liquid conductor 30 to rise on resistor 27 and concurrently to fall on resistor 26, again unbalancing balanceable network 33 but in the opposite sense. Accordingly, an unbalance signal of opposite sense and of magnitude corresponding to the inclination of container 20 is then developed. This oppositely polarized signal is amplified in preamplifier 37, passed through cable 12, amplified in amplifier 51, and indicated on indicator 53 in a manner similar to that already described for a clockwise inclination of spherical container 20. Similarly, this voltage would enter the computers 54, 56 and 58 and be combined with the rate voltage from generator 50a in a manner similar to that already described for clockwise inclination of spherical container 20. However, this signal being of opposite polarity to the first-described signal, the indication on indicator 53 will be in the opposite direction from a zero line, and the voltage applied to integrator 58 will cause the indication representative of horizontal displacement to be decreased in value, indicating that the reversed angle of inclination along a lower section of the well has caused the unit in the well to return to a position nearer vertical alignment with its point of origin on the surface, i. e. the well has curved back and, at a lower point, is nearer the horizontal point marking the well mouth.

In a like manner, resistors 28 and 29 associated with balanceable network 34 and energized by battery 36b, will provide unbalance signals between conductors 41 and 43 of cable 12 responsive to inclination of exploration unit 10 in the vertical plane originally defined by resistor pair 28 and 29 with exploration unit 10 in the original vertical position. This signal, $e_2$, is similarly amplified by amplifier 52 to $Ae_2 = e'_2$ and applied to indicator 53a to provide an indication or record indicative of the angle of inclination of the unit with respect to the vertical plane defined by resistor pair 28—29 as a function of depth in the well. This plane, as above described, is angularly spaced in azimuth with respect to the vertical plane through resistors 26, 27. Computing circuits 55, 57 and 59 perform the same functions upon this second unbalance signal and multiply it with the same rate of lowering voltage $k_1 dL/dt$ to provide an integrated signal $k_2 \int_0^t \sin (e'_2) dL/dt$ which is representative of the horizontal displacement along this second vertical plane as a function of depth in the well. This second horizontal displacement signal is exhibited on indicator-recorder 61 as a function of depth in the well.

Fig. 4 illustrates one form of apparatus for obtaining an output voltage proportional to the product of the sine function of the unbalance signals $e_1$ and $e_2$ times the rate of lowering of the exploration unit in a well and therefore usable as the input to integrators 58 and 59 of Fig. 3, and replacing computers 56 and 57. Wheel 50, driven at a rate proportional to the rate of lowering of exporation unit 10, may be used to drive generators 70 and 71. The field of generator 70 is excited by a voltage proportional to the sine function of unbalance signal $e'_1$. The voltage output of generator 70 will be proportional to the product of its rotational speed multiplied by the voltage energizing its field windings. The output voltage, which may be expressed as $k_2 \sin (e'_1) dL/dt$ is applied to integrator 58. In a similar manner, the field windings of generator 71 may be excited by a voltage proportional to the sine function of the unbalance signal $e'_2$. The output voltage of generator 71 will be proportional to the product of the rotational speed multiplied by the voltage energizing its field windings and can be expressed as $k_2 \sin (e'_2) dL/dt$ and is applied to integrator 59. The voltage outputs from generators 70 and 71 respectively applied to integrators 58 and 59 provide outputs representative of the horizontal displacement components along the vertical planes determined by the great circles of resistor pair 26—27 and of resistor pair 28—29.

Fig. 5 illustrates apparatus suitable for use as integrators 58 and 59 of Fig. 3. Series motor 72 is connected to computer 56, which may be generator 70 of Fig. 4. Motor 72 rotates at a speed proportional to the voltage applied thereto and in a direction determined by the polarity of the applied voltage. Since the applied voltage is representative of the differential expression for horizontal displacement ($k_2 \sin (e'_1) dL/dt$), the motor 72 will run in correspondence therewith as to speed and direction during the period of lowering of exploration unit 10 and its total travel will be representative of the integration of this differential expression. Motor 72 drives worm gear 73, preferably of high reduction ratio, so that the shaft 73 and wheel 76 move by an amount representative of the total motion of motor 72.

When motor 72 receives a voltage of reverse polarity, as upon reversal of the inclination of exploration unit 10, it will rotate in a reverse direction, thereby decreasing the total motion indicated by shaft 74 and wheel 76. In the particular arrangement shown, wheel 76 drives wire or string 75 which is stretched over wheels 76 and 77 and which carries an indicator or stylus 78. Motion of indicator 78 from a mid-line or zero position to the right or to the left is indicative of rotation of motor 72 in one direction or the other for a considerable number of revolutions. If motor 72 ceases to rotate, either because the unbalance signal providing the sine function voltage has become zero, indicating zero inclination of exploration unit 10, or because the rate of lowering of exploration unit 10 has become zero, motion of indicator 78 will cease but the displacement of indicator 78 which existed at that instant from the mid-line or zero will remain, thereby indicating a fixed horizontal displacement of the well bore. If the lowering motion of exploration unit 10 has ceased, and this is the cause of the voltage on motor 72 decreasing to zero, the mechanical motion of chart 79 driven by wheel 50 will likewise cease. If the angle of inclination from vertical decreases to zero, motor 72 will cease to rotate, and indicator 78 will remain in its position as of that instant but since the lowering of exploration unit 10 continues, mechanical drive of wheel 50 to chart 79 will likewise continue and the plot from indicator 78 will show a steady horizontal displacement with increasing depth in the well. Thus, it is seen that the motion of the system including motor 72 and indicator 78 integrates the differential expression for horizontal displacement to provide the integrated value of horizontal displacement and wheel 50 drives chart 79 to plot this horizontal displacement as a function of depth in a well.

In a similar manner, motor 80 may be driven by the voltage from computer 57, which in one embodiment can be generator 71 of Fig. 4. The output from generator 71 is the product of the sine function of unbalance voltage $e'_2$ and the rate of lowering of the exploration unit in the well, which product is a differential expression for horizontal displacement in the vertical plane defined by resistor pair 28—29 when exploration unit 10 is in the vertical position. The total rotational motion of motor 80 is the integral of the voltage applied thereto. Integration of this voltage $k_2 \sin (e'_2) dL/dt$ determines the total horizontal displacement in the vertical plane defined by resistor pair 28—29. Worm gear 81 preferably is of a high reduction ratio, so that the motion of shaft 82 and wheel 84 serves to total the motion of motor 80 in both directions of rotation for a considerable number of turns in either direction. In the particular apparatus shown, wheel 84 drives wire or string 83 which is supported by wheels 84 and 85 and carries indicator or stylus 86. The motion of indicator 86 from its midline or zero position is representative of the total motion of motor 80 and serves to indicate or exhibit the integral of the voltage applied to motor 80. Wheel 50 also drives chart 87 so that this integration of the voltage applied to motor 80 is plotted as a function of depth in the well to which exploration unit 10 is lowered. As previously described, this integrated value is representative of the horizontal displacement of the well in the plane defined by resistor pair 28—29 when exploration unit 10 is in the vertical position.

From the curves traced by the recorders 60—61, a three-dimensional plot or model of the well bore can be made.

Fig. 6 illustrates an arrangement providing as its output a voltage equal to the sine function of the voltage provided as its input and therefore suited for use as either of devices 54, 55 of Fig. 3. The basic structure is a version of a familiar Scotch-yoke mechanism. Disc 92 or equivalent crank arm is mounted with its center in line with the mid-point of support members 96 and 97 and equidistant therebetween. Pin 93 is mounted in disc 92 at or near its outer edge and engages slot 94 in sliding member 95. A contact 100 carried by sliding member 95 engages resistor 98 to select varying fractions of the voltage from source 99 in dependence upon the position of pin 93. From examination of Fig. 6 it is apparent that if an incoming voltage to galvanometer or motor movement 91 rotates disc 92 through an angle $\theta$ proportional to the magnitude of the input voltage, pin 93 will move transverse sliding member 95 along supports 96 and 97 a distance representative of the sine function of angle $\theta$, selecting a voltage from resistor 98 which, in turn, is representative of the sine function of the input voltage to armature 91 in an amount determined by the sine of the angle $\theta$. As above stated, the structure illustrated in Fig. 6 is one embodiment of a sine function computer suitable for use as computers 54 and 55; other mechanical and electronic systems for producing a sine function of the input voltage to a computer are known to the art and will now suggest themselves to those skilled in the art as suitable for use as computers 54 and 55 of Fig. 3.

To operate this well-surveying system, an exploration unit 10, assembled as in Fig. 1, is suspended in vertical position prior to lowering in a well. With unit 10 so suspended, liquid conductor 30 will contact the resistor pairs 26—27 and 28—29 and short them out in amounts representative of their reference position. Balanceable networks 33 and 34 are then adjusted for a minimum or zero output to cable 12 and direct-current amplifiers 51 and 52. For this purpose, resistors 33a and 33b are adjusted for zero indicated signal on indicator 53, and resistors 34a and 34b are adjusted for zero indicated signal on indicator 53a. No recording trace will be produced by indicators 53 and 53a until the lowering process is initiated.

With the balanceable networks 33 and 34 adjusted for zero output with unit 10 in the vertical position, gyroscope 13 and its associated servomechanism 14—18 are energized through cables 12 and 13a and oriented in azimuth so that spherical container 20 of unit 10 is thereafter maintained in that azimuthal position which, in turn, maintains resistor pairs 26—27 and 28—29 aligned with the vertical great-circle planes with respect to which respective components of the angle of inclination are to be measured. It is to be noted that the planes defined by the great circles upon which the respective resistor pairs lie respectively coincide with the vertical planes in which the components of inclination are to be measured only when the exploration unit 10 is in the vertical position. When the well and the exploration unit 10 therein incline along an azimuth bearing which lies between the planes defined by resistor pairs 26—27 and 28—29, the great circles of these resistor pairs will move out of alignment with their respective vertical planes, but the lines defined by the points of intersection between the resistor pairs and the level surface of the liquid conductor 30 will continue in alignment with the respective vertical planes. For example, in Fig. 2 assume that an inclination has occurred in the plane of resistor pair 26—27 so that the effective values of resistor 26 and of resistor 27 have been changed. Now assume that a second component of inclination occurs along the plane defined by resistor pair 28—29. This second inclination will move the great circle plane of resistor pair 26—27 out of the vertical plane which it originally defined, but the line of intersection of the liquid conductor with resistor 26 and the intersection of liquid conductor 30 with resistor 27 will remain aligned with that vertical plane. Similarly, for resistor pair 28—29, inclination along the vertical plane initially defined by the great circle plane of resistor pair 26—27 will move the great circle of resistor pair 28—29 out of the vertical plane that was originally defined thereby, but will not disturb the alignment of the line defined by the intersection of liquid conductor 30 with resistors 28 and 29. The gyroscope 13 and its associated servomechanism 14—18 rotate spherical container 20 an amount equal and opposite to any rotation of exploration unit 10 in the well and hence preserve the essential relationship: in brief the adjustment insures the continued alignment of the lines of intersection of liquid conductor 30 with the respective resistor pairs with the vertical planes of measurement initially defined by the great circle planes of the respective resistor pairs.

With calibration and alignment completed, exploration unit 10 is lowered into the well to be surveyed. As the lowering motion occurs, wheel 50 will be driven at a rate such that the angular velocity thereof is proportional to the velocity of exploration unit 10 in the bore hole or well. This motion is mechanically coupled to the charts of indicators 53—53a and 60—61 so as to plot the information exhibited thereon as functions of depth in the well. This rotary motion of wheel 50 further drives generator 50a to produce a voltage proportional to the rate of lowering of exploration unit 10 for use in computers 56 and 57, or in an alternate embodiment, drives generators 70 and 71 which combine the functions of generator 50a with the functions of computers 56 and 57. As exploration unit 10 encounters inclined portions of the well on its descent therein, exploration unit 10 will be inclined in the same manner, and the balanceable networks 33 and 34 will provide unbalance signals representative of the components of this inclination along the vertical planes initially defined by resistor pairs 26—27 and 28—29. These unbalance signals will be amplified in preamplifiers 37 and 38 and surface amplifiers 51 and 52 as necessary for the production of a signal of appropriate magnitude for recording and actuation of the computer system. The components of the angle of inclination will be recorded on indicators 53 and 53a as functions of depth in the well, while the computer channels for each of the unbalance signals will produce a signal or displacement of an indicator representative of the horizontal displacement or horizontal drift as a function of depth in the well. It will be seen that the rate of lowering need not be carefully adjusted to any predetermined speed, nor must the lowering process be stopped for readings at any point. Lowering can proceed at speeds most suitable to the hoisting and lowering rig and to the nature of the well or bore hole being surveyed, and this lowering rate can vary in any desired manner without disturbing the indications and recordings exhibited by the surface portions of this system.

Fig. 7 illustrates a modification of Fig. 3 in which the balanceable bridges 33 and 34 are energized by A. C. generators 110 and 130 which may be disposed in the nose of the exploration unit 10A, as shown in Fig. 8. The cable 13a provides power for the integral driving motors of the generators as well as to the servo-mechanisms 14—18. The unbalance signals of the bridges resulting from inclination of spherical container 20 are alternating voltages of frequency $f_1$ or $f_2$ respectively representative of inclination in the vertical planes in which the components of the inclination are measured, whose phases are representative of the sense and whose amplitudes are representative of the magnitude of their respective components of the inclination from the vertical.

Considering bridge network 33 of Fig. 7, an unbalance signal is amplified in preamplifier 37, conducted to the surface by means of multiple-conductor cable 120, and amplified to a suitable level in amplifier 51. The unbalance signal at the input to amplifier 51 can be expressed as $e_1 \sin (2\pi f_1 t \pm a)$ where $e_1 \sin (2\pi f_1 t) =$ the alternating voltage from generator 110, and $a =$ either 0 degrees, or 180 degrees, and is indicative of the phase of the unbalance signal, depending on sense of inclination from vertical. The amplifier 51 increases this signal by a factor A, to $Ae_1 \sin (2\pi f_1 t \pm a)$. To produce a signal useful in the computer circuits described for Fig. 3, this unbalance signal is applied to the balanced input transformer 112, driving detectors 113 and 114. These detectors are also energized by a voltage in phase with that supplied to balanceable circuit 33 from generator 110; this voltage is transmitted through conductors 116 and 117 to the center-tap of resistor 115 and to the center-tap of input transformer 112. This second voltage is of greater amplitude than the largest unbalance signal and is expressed as $ke_1 \sin (2\pi f_1 t)$. It is applied simultaneously to both detectors 113 and 114. When positive half-waves from both inputs are applied to one of the detectors, that detector will conduct current while the other detector is non-conductive. A direct current, whose polarity is dependent upon the phase relation between the unbalance signal applied to transformer 112 and the energizing or modulating voltage applied by conductors 116 and 117, will flow through output resistor 115. With the voltage from conductors 116 and 117 greater in amplitude than the signal from transformer 112, this direct current output will be proportional in its magnitude to the amplitude of the unbalance signal. This direct current produces a corresponding direct voltage $e'_1$, which is applied to computer 54 as described for $e'_1$ in Fig. 3.

In a similar manner, the second generator 130 applies an alternating voltage of frequency $f_2$ to bridge circuit 34. The inclination of spherical container 20 develops an unbalance signal at frequency $f_2$, which is amplified in preamplifier 38, conducted to the surface by conductors 41 and 43 of cable 120, and amplified to a suitable level in amplifier 52. This amplified voltage is applied to input transformer 132, driving detectors 133 and 134. These detectors are also energized by a voltage in phase with that supplied to balanceable circuit 34 from generator 130 and of greater amplitude than the unbalance signal, which voltage is transmitted through conductors 136 and 137 to the center-tap of resistor 115 and to the center-tap of input transformer 112. The detector which receives positive half-cycles of voltage from both inputs at the same time will conduct, and thus a direct voltage $e'_2$ whose polarity depends upon the phase relation between the unbalance signal applied to transformer 132 and the voltage applied by conductors 136 and 137 is developed across resistor 135. The magnitude of voltage $e'_2$ varies with the amplitude of the unbalance signal. This voltage is applied to computer 55 as described for $e'_2$ in Fig. 3.

While detectors 113—114 and 133—134 are shown and described as thermionic vacuum or gas tubes, it will be obvious that any equivalent thereof such as transistors or dry rectifiers could be used for the same step in the measuring process.

The preadjustment and calibration of the alternating current embodiment of this system is generically the same as for the direct current embodiment of Figs. 1–3. Once the exploration unit 10a is ready for use, it can be lowered into a well, and will function therein as described for Figs. 1–3.

While the embodiments described are preferred embodiments to show how the invention can be practiced, other embodiments within the scope of the invention will occur to those persons skilled in the art.

What is claimed is:

1. A well-surveying system comprising balanceable circuit means adapted for lowering into a well and including impedance means variable in response to inclination of said well from the vertical, which inclination is resolved into components along a plurality of angularly related vertical planes to provide a plurality of unbalance signals, each of said signals being of sense and magnitude proportional to the component of the inclination along a particular vertical plane, conductive means to transmit said unbalance signals from said circuit means to the surface, voltage-generating means to provide a voltage proportional to the rate of lowering of said circuit means into a well, and measuring means responsive to said unbalance signals and to the voltage from said generating means to exhibit components of the horizontal displacement of the well along said vertical planes as a function of the depth of said circuit means in the well.

2. A well-surveying system comprising balanceable circuit means adapted for lowering into a well and including impedance means variable in response to inclination of said well from the vertical, which inclination is resolved into components along a plurality of angularly related vertical planes to provide a plurality of unbalance signals, each of said signals being of sense and magnitude proportional to the component of the inclination along a particular vertical plane, conductive means to transmit said unbalance signals from said circuit means to the surface, voltage-generating means to provide a voltage proportional to the rate of lowering of said circuit means into a well, measuring means responsive to said unbalance signals to exhibit the angle of inclination of the well along said vertical planes as a function of the depth of said circuit means therein, and measuring means responsive to said unbalance signals and to the voltage from said generating means to exhibit the horizontal displacement of the well along said vertical planes as a function of the depth of said circuit means in the well.

3. A well-surveying system comprising an inclinometer adapted to be lowered into a well and including a spherical container rotatable about the axis of the inclinometer, a first pair of resistors mounted on the inside of said spherical container on a first great circle through the axis, a second pair of resistors mounted on the inside of said spherical container on a second great circle through the axis in fixed angular relation to the first great circle, a conductive liquid partially filling said container to vary the effective magnitude of all said resistors as functions of a varying angle of inclination of said axis, and two bridge networks respectively including said pairs of resistors to produce unbalance signals respectively representative of components of said angle of inclination in vertical planes having the same angular relation as said great circles and respectively aligned with the planes defined by said great circles when said inclinometer is in the vertical position; an azimuth-sensitive stabilizer for retaining the axis of said spherical container in a predetermined azimuth orientation; a multiple-conductor cable for lowering said inclinometer into a well and for conducting said unbalance signals to the surface; measuring means connected to said cable to exhibit the angle of inclination of a well along said vertical planes as a function of the position of said inclinometer therein; a generator coupled for drive by motion of said cable to provide a voltage proportional to the velocity of the inclinometer in a well; and measuring means connected to said generator and to said cable to exhibit the horizontal displacement of the well along said vertical planes as a function of the position of said inclinometer in the well.

4. A well-surveying system comprising an inclinometer adapted for lowering into a well and responsive to inclination of said well from the vertical along first and second angularly spaced vertical planes to provide first and second unbalance signals representative of inclination along respective vertical planes, including first balanceable circuit means, second balanceable circuit means, a liquid conductor commonly in circuit with said first and said second circuit means, and an azimuth-sensitive stabilizer to retain said first and said second circuit means respectively in predetermined relationships with said first and said second angularly spaced vertical planes; a multiple-conductor cable for lowering said inclinometer in a well and for conducting said unbalance signals from the inclinometer to the surface; a generator coupled for drive by motion of said cable to provide a voltage proportional to the velocity of the inclinometer in a well; a calculator responsive to said unbalance signals and to the generator voltage to provide output voltages each representative of the calculus integral of the product of the sine function of an unbalance signal multiplied by the generator voltage; and means for indicating and recording the unbalance signals representative of inclination and the calculator output representative of total horizontal drift as functions of the depth of said inclinometer in a well.

5. A well-surveying system comprising an exploration unit for lowering in a well, a structure mounted for rotation in the casing of said exploration unit about the axis thereof and supporting elements of impedance variable with change in the inclination of the axis of said unit, azimuth-sensitive means in said unit for maintaining a predetermined azimuthal orientation of said structure, networks including said impedances to produce signals of sense and magnitude corresponding with components of the inclination of the exploration unit in a well with respect to vertical planes of predetermined azimuthal relation, a cable for lowering the unit and for conducting said signals to the surface, a generator coupled for drive by motion of said cable, and measuring means at the surface connected to said generator and by said cable connected to said networks to produce movement of exhibiting elements corresponding to components of the horizontal displacement of said well in said vertical planes.

6. A well-surveying system comprising an exploration unit for lowering in a well, a structure mounted for rotation in the casing of said exploration unit about the axis thereof and supporting elements of impedance variable with change in the inclination of the axis of said unit, azimuth-sensitive means in said unit for maintaining a predetermined azimuthal orientation of said structure, networks including said impedances to produce signals of sense and magnitude corresponding with components of the inclination of the exploration unit in a well with respect to vertical planes of predetermined azimuthal relation, a cable for lowering the unit and for conducting said signals to the surface, a generator coupled for drive by motion of said cable, measuring means at the surface connected to said generator and by said cable connected to said networks to produce movement of exhibiting elements corresponding to components of the horizontal displacement of said well in said vertical planes, and measuring means at the surface connected by said cable to said networks to produce movement of exhibiting elements corresponding to components of the inclination of said well in said vertical planes.

7. A well-surveying system comprising an inclinometer adapted to be lowered into a well, a spherical container mounted in said inclinometer and rotatable about the axis thereof, a first pair of impedances mounted on the inner surface of said spherical container on a first great circle through the axis thereof, a second pair of impedances mounted on the inner surface of said spherical container on a second great circle through the axis thereof in fixed angular relation to the first great circle, a conductive liquid partially filling said container to contact said impedances and to short-out the immersed portions thereof and to vary the effective magnitude of all impedances as functions of the angle of inclination of said axis, a source of alternating voltage at a first frequency energizing said first pair of impedances and providing a phase-comparison signal, a source of alternating voltage at a second frequency energizing said second pair of impedances and providing a phase-comparison signal, two bridge networks respectively including said pairs of impedances to produce unbalance signals at the first and second frequencies respectively representative of components of said angle of inclination in vertical planes respectively defined by said great circles when said inclinometer is in vertical position, an azimuth-sensitive stabilizer to retain the axis of said spherical container in a predetermined azimuth orientation, a cable for lowering said inclinometer into a well and for conducting signals from and power to said inclinometer, measuring means connected to said cable and responsive to said unbalance and said phase-comparison signals to exhibit the angle of inclination of a well resolved into components in said vertical planes as functions of the position of said inclinometer therein, a generator coupled for drive by motion of said cable to provide voltage proportional to the velocity of the inclinometer in a well, and measuring means connected to said cable and to said generator and responsive to said unbalance signals and said phase-comparison signals and to said generator voltage to exhibit the horizontal displacement of the well along said vertical planes as functions of the position of said inclinometer in the well.

PHILLIP M. GREEN.

References Cited in the file of this patent

UNITED STATES PATENTS

| Number | Name | Date |
|---|---|---|
| 1,100,698 | Stoddard | June 16, 1914 |
| 1,109,667 | Dikeman | Sept. 8, 1914 |
| 1,317,072 | Carlier | Sept. 23, 1919 |
| 1,890,607 | Hite | Dec. 12, 1932 |
| 2,362,616 | Cloud | Nov. 14, 1944 |
| 2,367,465 | Kunzer | Jan. 16, 1945 |

FOREIGN PATENTS

| Number | Country | Date |
|---|---|---|
| 558,616 | Great Britain | 1944 |